Sept. 28, 1965 C. H. PANCOAST 3,208,154
WHEEL ALIGNMENT MEASURING SYSTEM
Filed Nov. 30, 1962 2 Sheets-Sheet 1

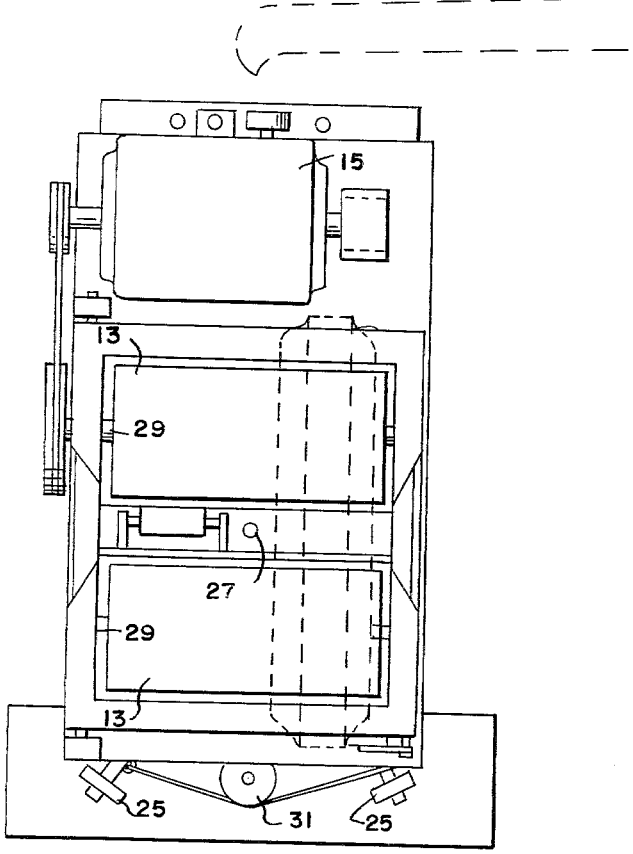
FIG.2.
FIG.3.
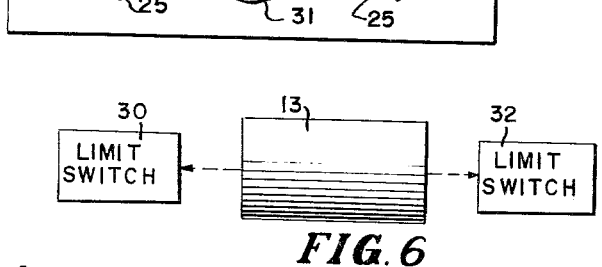
FIG.6
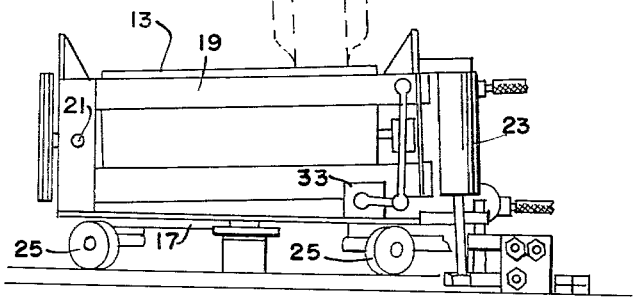

United States Patent Office 3,208,154
Patented Sept. 28, 1965

3,208,154
WHEEL ALIGNMENT MEASURING SYSTEM
Charles H. Pancoast, Pitman, N.J., assignor to Socony
Mobil Oil Company, Inc., a corporation of New York
Filed Nov. 30, 1962, Ser. No. 241,245
10 Claims. (Cl. 33—203.13)

This invention relates to a wheel alignment measuring system, and more particularly to a wheel alignment measuring system with an improved horizontal stabilizer.

The system of the present invention is intended to be used in a diagnostic system which is designed to diagnose almost any condition needing correction in an automotive vehicle in the shortest possible time with a minimum of personnel. This diagnostic system is disclosed in the copending application Serial No. 241,214 entitled "Vehicle Diagnostic System" invented by George B. Myrtetus and Charles H. Pancoast and filed on the same day as the present application. The copending application Ser. No. 241,214 has been abandoned in favor of a continuation-in-part application Serial No. 276,702 of George B. Myrtetus and Charles H. Pancoast entitled "The Servicing of Automotive Vehicles Including the Diagnosis and Repair of Conditions of Automotive Vehicles Needing Correction," filed on April 30, 1963. The continuation-in-part application Serial No. 276,702 contains substantially all of the disclosure of the application Serial No. 241,214.

There have been developed many sophisticated techniques and equipment for testing and checking automotive vehicles for various defects, malfunctionings, and other conditions which require correction. These techniques and equipment are all very specialized and are designed to diagnose only very specific conditions. Since there are a large number of conditions which might require correction, it is a long drawn out process to thoroughly test an automotive vehicle in order to provide diagnoses which will diagnose any condition in an automotive vehicle needing correction, particularly if such condition is not evident to the operator or owner of the vehicle. As a result it is not economically practical for a vehicle owner to pay to have this kind of diagnosis performed or for a garage to perform it. The usual procedure is to wait until trouble becomes disturbing and then perform tests to determine the cause of the particular trouble and correct it. This procedure often results in increased expense because the condition was not corrected soon enough. Moreover, since the vehicle owners are not willing to pay the cost of thorough testing and checking, it is not economically practical for a garage to keep on hand the expensive equipment required to perform the more sophisticated testing techniques. As a result many modern testing techniques which would more accurately diagnose conditions requiring correction in the vehicle are not available to the vehicle owner.

The diagnostic system disclosed in the above-mentioned copending application will completely test and check many automotive vehicles in a short period of time employing just two diagnosticians. Because the entire testing and checking procedure is performed in a short period of time with a minimum of personnel, it can be carried out for a nominal cost and for the first time it is economically practical to thoroughly test and check automotive vehicles so that conditions can be corrected before they become expensive thus saving the vehicle owners substantial repair costs.

In order for the diagnostic system of the above-mentioned copending application to be economically practical, the entire testing process must be carried out in just a few minutes. Thus time is of the essence and any feature which will save even a few seconds is important to the system, as it is only by these time saving features that the system becomes economically practical. The wheel alignment measuring system of the present invention reduces the time to take wheel alignment measurements and thus saves valuable time in the testing procedure of the diagnostic system. Thus the wheel alignment measuring system of the present invention contributes substantially to the making of the system disclosed in the above-mentioned copending application economically practical.

The wheel alignment measuring system of the present invention comprises two pairs of rollers spaced to receive the right and left wheels of an automotive vehicle. The front wheels of the vehicle are positioned on these rollers and the rollers drive the vehicle wheels. In response to the interaction between the rollers and the vehicle wheels, the axes of the rollers are aligned parallel with the axes of the vehicle wheels. After this action has been carried out, the angular position of the roller axes with respect to a reference are measured to provide an indication of the alignment of the vehicle wheels. When the front wheels of the vehicle are being driven by the rollers, the vehicle must be stabilized to keep it from sliding horizontally off the rollers of the alignment apparatus. Prior to the present invention, this stabilization was provided by a bar which was bolted to the center of the vehicle. The attachment of this bar to the vehicle takes a relatively long time and thus causes the wheel alignment measuring process to take a relatively long period of time. The present invention provides an improved horizontal stabilizer in which braces on tracks move in to engage the vehicle on each side thereof to hold the vehicle on the rollers. These braces engage the wrap-around or end part of the bumper of the vehicle and are driven into engaging position by hydraulic cylinders. Since the stabilizer of the present invention does not have to be bolted to the vehicle, the time for applying it to the vehicle is greatly reduced, and thus valuable time is saved. Moreover, the stabilizer lends itself to being operated remotely so that controls can be provided to permit the diagnostician taking the wheel alignment measurements to control the horizontal stabilizer and apply it to the vehicle from the driver's seat of the vehicle. Thus a single diagnostician can perform the entire wheel alignment measuring process without getting out of the driver's seat and more time is saved. The time saved by the present invention contributes substantially to the making of the diagnostic system disclosed in the above-mentioned copending application economically practical.

Accordingly, an object of the present invention is to provide an improved wheel alignment measuring system.

Another object of the present invention is to provide a wheel alignment measuring system with an improved horizontal stabilizer.

A further object of the present invention is to reduce the time to obtain measurements of wheel alignment.

A still further object of the present invention is to provide a wheel alignment measuring system which will operate more quickly to provide wheel alignment measurements.

A still further object of the present invention is to provide in a wheel alignment measuring system a horizontal stabilizer which can be more quickly applied to a vehicle.

A still further object of the present invention is to provide in a wheel alignment measuring apparatus a horizontal stabilizer which can be applied to a vehicle by remote control.

Further objects and advantages of the invention will become readily apparent as the following detailed description of the invention unfolds and when taken in conjunction with the drawings, wherein:

FIG. 2 is a view in elevation of the alignment apparatus for one of the wheels;

FIG. 3 is a plan view of the apparatus shown in FIG. 2;

FIGURE 6 is a schematic diagram illustrating the operation of the measuring system.

Figure 1:
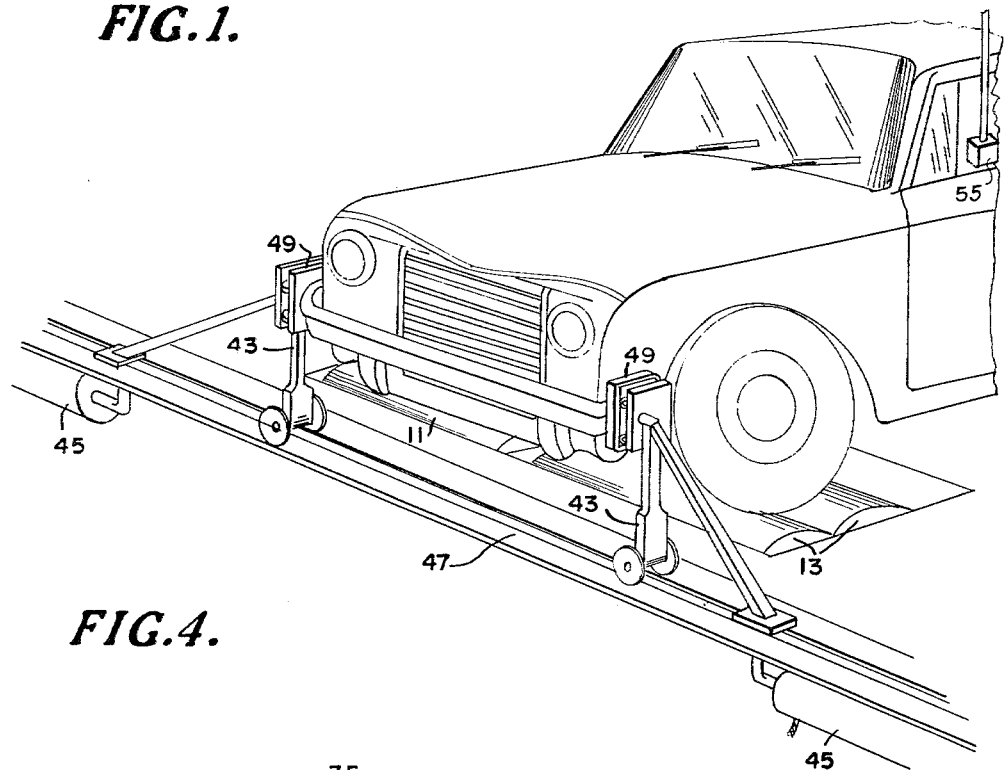
FIG. 1 is a perspective view illustrating the overall system of the invention.
Figure 4:
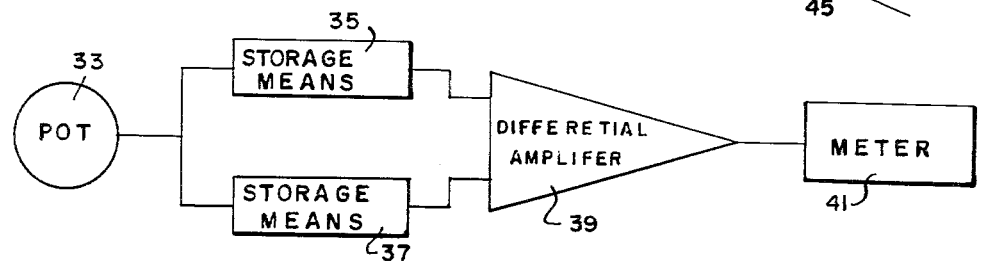
FIG. 4 is a circuit used in the alignment measuring system.

The alignment apparatus of the present invention provides an indication of the caster and camber of the left wheel, an indication of the caster and camber of the right wheel, and an indication of the total toe of the front wheels. To take these alignment measurements on an automotive vehicle, the vehicle is driven to position its front wheels on the pairs of rollers 11 and 13 as shown in FIG. 1. The rollers 11 and 13 are mounted on carriages. When the front wheels of a vehicle are on the rollers 11 and 13, the rollers 11 and 13 are driven at a constant speed by electric motors and in turn the rollers 11 and 13 drive the front wheels of the vehicle. Means are provided in the carriages mounting the rollers 11 and 13 to position the rollers 11 and 13 so that the axes of the rollers 11 are parallel with the axis of the right front wheel of the vehicle and the axes of the rollers 13 are parallel with the left front wheel of the vehicle. FIGS. 2 and 3 show the details of the carriage mounting the rollers 13 and illustrate how the carriage aligns the axes of the rollers 13 parallel with the axis of the left front wheel. The carriage mounting the rollers 11 aligns the axes of the rollers 11 with the axis of the right front wheel in the same manner that the carriage mounting the rollers 13 aligns the rollers 13. As shown in FIGS. 2 and 3, the rollers 13 are driven by electric motor 15 which is also mounted on the carriage. The carriage comprises a base 17, on which the electric motor 15 is mounted, and an upper bracket 19 which is pivotable with respect to the base 17 and on which the rollers 13 are rotatably mounted. The bracket 19 pivots on the base 17 about a pivot point designated 21 and the amount that the bracket 19 is pivoted with respect to the base 17 is controlled by means of a hydraulic servo unit 23. The base 17 is mounted on rollers 25 and is pivotable about a fixed vertical axis 27 on the rollers 25. When the rollers 13 are driving the front wheel of the vehicle the base 17 will pivot about the vertical axis 27 due to forces exerted on the rollers 13 by the vehicle wheel until the horizontal components of the axes of the rollers 13 are parallel with the horizontal component of the axis of the vehicle wheel. However, due to the camber of the wheel, the axes of the rollers 13 will still not necessarily be parallel with the axis of the wheel. The hydraulic servo unit 23 will pivot the bracket 19 with respect to the base 17 until the axes of the rollers 13 are parallel with the axis of the vehicle wheel. To provide the control for the hydraulic servo unit 23 to achieve this result, the rollers 13 are axially slidable short distances on their axles 29. When the rollers 13 are driving the vehicle wheel and the axis of the vehicle wheel due to its camber is not aligned with the axes of the rollers 13, the vehicle wheel will exert forces on the rollers 13 sliding them to one side or the other, depending upon the direction of the misalignment. As illustrated in FIGURE 6, the rollers 13, on being slid to one side, will actuate a limit switch 30, and in response to the actuation of this limit switch the hydraulic servo unit 23 will be energized to change the angular position of the bracket 19 with respect to the base 17 in a direction to eliminate the misalignment of the axis of the vehicle wheel with the axes of the rollers 13. Preferably the limit switches are of the type sold under the trademark Micro Switch. Similarly, when the rollers 13 are slid to the other side in response to the misalignment being in the opposite direction, the rollers 13 will actuate a limit switch 32, in response to which the hydraulic servo unit 23 will change the angular position of the bracket 19 with respect to the base 17 in the opposite direction until the misalignment is eliminated. In this manner the axes of the rollers 13 are made parallel with the axis of the vehicle wheel. A potentiometer 33 produces an output signal representing the angular position of the base 17 with respect to the fixed vertical axis 27. When the rollers 13 have been aligned with the vehicle wheel, the output signal of the potentiometer 31 will therefore represent the toe of the vehicle wheel. A potentiometer 33 produces an output signal representing the angular position of the bracket 19 with respect to the base 17. When the rollers 13 have been aligned with the vehicle wheel, the output signal of the potentiometer 33 will represent the camber of the vehicle wheel. The carriage supporting the rollers 17 produces output signals representing toe and camber in the same manner. To obtain the caster of a vehicle wheel on the rollers 13, the alignment measuring apparatus uses the circuit illustrated in FIG. 4. While the rollers 37 drive the vehicle wheel thereon and the rollers are maintained aligned therewith, the vehicle wheels are turned 7½° to the right. The output signal voltage of the potentiometer 33 when the wheels are turned 7½° to the right is stored in a storage means 35. The vehicle wheels are then turned 7½° to the left and the output signal voltage of the potentiometer 33 is stored in a storage means 37. A differential amplifier 39 then amplifies the difference between the signal voltage stored in the storage means 35 and that stored in the storage means 37 and applies a signal proportional to this difference to a meter 41, which provides an indication of this signal. When these operations have been carried out, the output signal of the differential amplifier 39 will be proportional to and the meter 41 will indicate the caster of the wheel in the rollers 13. An identical circuit is provided for the rollers 11 to measure the caster of the wheel in these rollers in the same manner. The caster measuring operations are performed simultaneously so that the wheels only need to be turned to the right and to the left once to obtain the caster measurement for both wheels.

Figure 5:
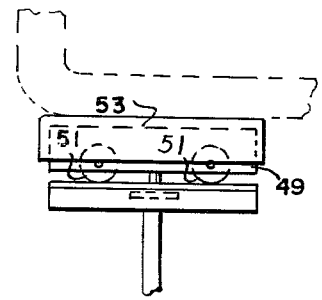
FIG. 5 is a top plan view illustrating details of the horizontal stabilizer of the present invention.

When the vehicle is being tested on the alignment measuring apparatus in this manner, it is necessary to hold the front of the vehicle in place so that it does not slide off the rollers to the right or the left. The device for providing this holding is called a horizontal stabilizer. The horizontal stabilizer of the present invention permits it to be quickly and easily applied to the vehicle without having to actually be bolted thereto, thus saving valuable time in the diagnostic procedure. As shown in FIG. 1, the horizontal stabilizer comprises a pair of braces 43, which are driven by hydraulic cylinders 45, on a track 47 recessed beneath the floor. Carriages 49 are mounted on the braces 43 to have a limited horizontal movement with respect to the braces 43 transverse to the direction that the braces themselves are moveable or in other words parallel to the direction that the vehicle is facing. The structural details of the carriages 49 and how they are mounted on the braces 43 is better illustrated in the top plan view of FIG. 5. The carriages 49 have rollers 51 which engage the braces to provide the limited motion for the carriages. Springs hold the carriages 49 normally in the center of their range of movement. The carriages 49 have mounted thereon rubber cushions 53 and are positioned to engage the wrap-around or end part of a vehicle bumper with these rubber cushions when the front wheels of the vehicle are lodged in the rollers 11 and 13 of the alignment apparatus. When the front wheels of the vehicle have been so positioned, the braces 43 are moved inwardly by the hydraulic cylinders 45 toward the vehicle on the track 47 until the rubber cushions 53 engage the wrap-around or end part of the bumper of the vehicle and firmly hold the front of the vehicle in position. Because the carriages 49, on which the rubber cushions are mounted, have a limited horizontal movement with respect to the braces 43, the braces 43 engaging the vehicle and holding the vehicle on the rollers 11 and 13 will not interfere with the caster reading operation. The moveable carriages permit the pivoting of the vehicle frame that ocurs when the front wheels are turned 7½° to the right and left during the caster reading procedure while still preventing the vehicle frame from moving sideways.

As shown in FIG. 1, a control pendant 55 hangs next to the driver's window when the front wheels of the vehicle are engaged by the rollers 11 and 13. By means of switches on the pendant 55, a diagnostician sitting in the driver's seat of the vehicle can control the operation of the wheel alignment measuring apparatus and can actuate the hydraulic pistons 45 to either move the braces 43 into engaging position or retract them away from the vehicle. Thus the entire wheel alignment measuring operation can be performed by a single diagnostician sitting in the driver's seat of the vehicle.

Thus there is provided an improved wheel alignment measuring system which can be operated to take wheel alignment measurements in a shorter period of time. Many modifications may be made to the above-described embodiment of the invention without departing from the spirit and scope of the invention which is defined in the appended claims.

What is claimed is:

1. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of said first set of rollers to align themselves parallel with the axis of the vehicle wheel engaged by said first set of rollers, means to rotate one of the rollers of said second set and cause the axes of said second set of rollers to align themselves parallel with the axis of the wheel engaged by said second set of rollers, and stabilizing means operable to engage the sides of an automotive vehicle adjacent the front wheels of such vehicle when the front wheels of such vehicle are engaged by said first and second sets of rollers to hold such vehicle in position so as to keep the front wheels thereof on said first and second sets of rollers.

2. A wheel alignment measuring apparatus having a first set of rollers positioned to engage the left front wheel of an automotive vehicle, a second set of rollers positioned to engage the right front wheel of an automotive vehicle, means to rotate one of the rollers of said first set and cause the axes of said first set of rollers to align themselves parallel with the axis of the vehicle wheel engaged by said first set of rollers, means to rotate one of the rollers of said second set to cause the axes of the rollers of said second set to align themselves parallel with the axis of the vehicle wheel engaged by said second set of rollers, and stabilizing means operable to engage the end parts of the bumper of an automotive vehicle when the front wheels of such vehicle are engaged by said first and second sets of rollers to hold such vehicle in position so as to keep the front wheels thereof on said first and second sets of rollers.

3. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of said first set of rollers to align themselves parallel with the axis of the vehicle wheel engaged by said first set of rollers, means to rotate one of the rollers of said second set and cause the axes of said second set of rollers to align themselves parallel with the axis of the vehicle wheel engaged by said second set of rollers, means operable to abut against one side of an automotive vehicle adjacent the front wheel thereof when such vehicle has its front wheels engaged by said first and second sets of rollers to prevent such vehicle from moving sideways in one direction off of said rollers, and means operable to abut against the other side of such vehicle adjacent the front wheel thereof to prevent such vehicle from moving sideways in the other direction off of said rollers.

4. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of the rollers of said first set to align themselves parallel with the axis of the vehicle wheel engaged by said first set of rollers, means to rotate one of the rollers of said second set and cause the axes of the rollers of said second set to align themselves parallel with the axis of the vehicle wheel engaged by said second set of rollers, first stabilization means operable to abut against the end part of the bumper of an automotive vehicle having its front wheels engaged by said first and second sets of rollers to prevent such vehicle from moving sideways in one direction off of said rollers, and second stabilization means on the opposite side of such vehicle from said first stabilization means operable to abut against the end part of the bumper of such vehicle to prevent such vehicle from moving sideways in the opposite direction off of said rollers.

5. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of the rollers of said first set to align themselves with the axis of a vehicle wheel engaged by said first set of rollers, means to rotate one of the rollers of said second set and cause the axes of the rollers of said second set to align themselves with a vehicle wheel engaged by said second set of rollers, first stabilization means selectively movable along a first predetermined path to abut against the side of a vehicle adjacent the front wheel thereof when such vehicle has its front wheels engaged by said first and second sets of rollers to prevent such vehicle from moving sideways in one direction off of said first and second sets of rollers, and second stabilization means on the opposite side of such vehicle from said first stabilization means selectively movable along a second predetermined path to abut against the other side of such vehicle adjacent the front wheel thereof to prevent such vehicle from moving sideways in the other direction off of said rollers, said first and second predetermined paths being transverse to the direction that a vehicle would face having its front wheels engaged by said first and second sets of rollers.

6. A wheel alignment measuring system comprising means defining an automotive vehicle driveway having an automotive vehicle entrance at one end thereof and an automotive vehicle exit at the other end thereof, a first set of rollers in said driveway adapted to engage the left front wheel of an automotive vehicle, a second set of rollers in said driveway adapted to engage the right front wheel of an automotive vehicle, means to rotate one of the rollers of said first set and cause the axes of the rollers of said first set to align themselves with the axis of a vehicle wheel engaged by said first set of rollers, means to cause one of the rollers of said second set to rotate and cause the axes of the rollers of said second set to align themselves with the axis of a vehicle wheel engaged by the rollers of said second set, and stabilization means operable to engage the sides of a vehicle adjacent the front wheels thereof when such vehicle has its front wheels engaged by said first and second sets of rollers to hold such vehicle in position to prevent the front wheels thereof from moving sideways off of said rollers.

7. A wheel alignment measuring system comprising means defining an automotive vehicle driveway having an automotive vehicle entrance at one end thereof and an automotive vehicle exit at the other end thereof, a first set of rollers in said driveway adapted to engage the left front wheel of an automotive vehicle, a second set of rollers in said driveway adapted to engage the right front wheel of an automotive vehicle, means to rotate one of the rollers of said first set and cause the axes of the rollers of said first set to align themselves with the axis of a vehicle wheel engaged by said first set of rollers, means to rotate one of the rollers of said second set and cause the axes of the rollers of said second set to align themselves with the axis of a vehicle wheel engaged by the rollers of said second set, and stabilization means selectively movable along predetermined paths to abut against the sides of an automotive vehicle adjacent the front wheels thereof when such automotive vehicle has its front wheels engaged by said first and second sets of rollers, said predetermined paths being transverse to the direction a vehicle would face when the front wheels thereof are engaged by said first and second sets of rollers.

8. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of the rollers of said first set to align themselves with the axis of a vehicle wheel engaged by the rollers of said first set, means to rotate one of the rollers of said second set and cause the axes of the rollers of said second set to align themselves with the axis of a vehicle wheel engaged by the rollers of said second set, and stabilization means operable to engage the sides of an automotive vehicle adjacent the front wheels thereof when such automotive vehicle has its front wheels engaged by said first and second sets of rollers, the portions of said stabilization means which engage the automotive vehicle being made of resilient material.

9. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of said first set of rollers to align themselves parallel with the axis of the vehicle wheel engaged by said first set of rollers, means to rotate one of the rollers of said second set and cause the axes of said second set of rollers to align themselves parallel with the axis of the wheel engaged by said second set of rollers, and stabilizing means operable to engage the sides of an automotive vehicle adjacent the front wheels of such vehicle when the front wheels of such vehicle are engaged by said first and second sets of rollers to hold such vehicle in position so as to keep the front wheels thereof on said first and second sets of rollers, said stabilizing means comprising supports and engaging members mounted on said supports to engage said vehicle, said engaging members being movable with respect to said supports in a horizontal direction parallel to the direction the vehicle engaged by said engaging members would be facing.

10. A wheel alignment measuring apparatus comprising a first set of rollers positioned to engage the left front wheel of an automotive vehicle, a second set of rollers positioned to engage the right front wheel of an automotive vehicle, means to rotate one of the rollers of said first set and cause the axes of the rollers of said first set to align themselves with the axis of a vehicle wheel engaged by said first set of rollers, means to rotate one of the rollers of said second set and cause the axes of the rollers of said second set to align themselves with a vehicle wheel engaged by said second set of rollers, first stabilization means selectively movable to abut against the side of a vehicle adjacent the front wheel thereof when such vehicle has its front wheels engaged by said first and second sets of rollers to prevent such vehicle from moving sideways in one direction off of said first and second sets of rollers, second stabilization means on the opposite side of such vehicle from said first stabilization means selectively movable to abut against the other side of such vehicle adjacent the front wheel thereof to prevent such vehicle from moving sideways in the other direction off of said rollers, and control means to control the movement of said first and second stabilization means positioned so that it can be operated by a person sitting in the driver's seat of a vehicle having its front wheels engaged by said first and second sets of rollers.

References Cited by the Examiner

UNITED STATES PATENTS

| | | | |
|---|---|---|---|
| 1,981,476 | 11/34 | Statz | 33—203.13 |
| 2,137,949 | 11/38 | Phelps | 33—203.13 |

FOREIGN PATENTS

| | | |
|---|---|---|
| 1,235,123 | 5/60 | France. |
| 1,249,316 | 11/60 | France. |
| 301,982 | 12/28 | Great Britain. |

ISAAC LISANN, *Primary Examiner.*